June 25, 1929.  L. G. KREMLACEK  1,718,862
JOCKEY STICK
Filed Dec. 13, 1928
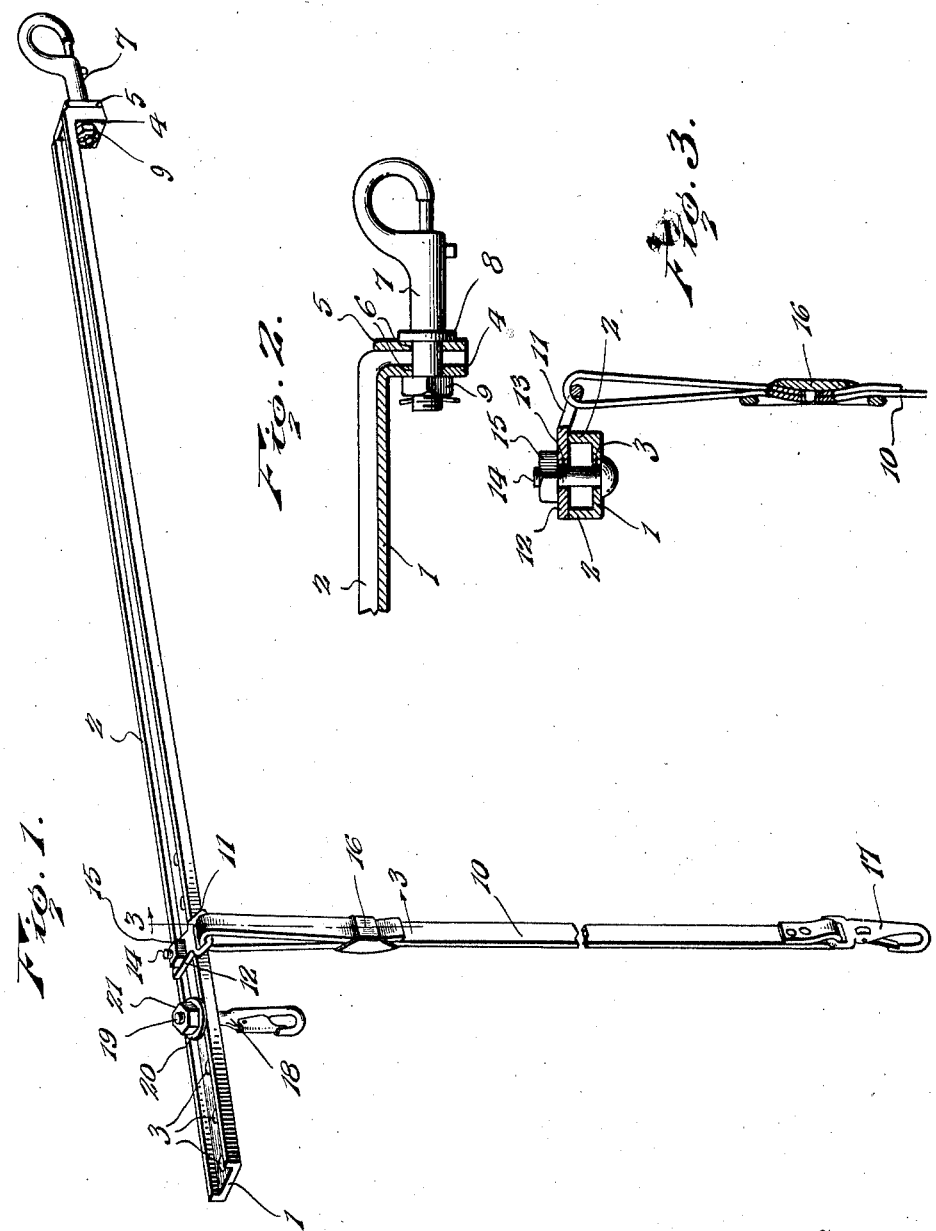
Inventor
L. G. Kremlacek.
By Lacey & Lacey, Attorneys

Patented June 25, 1929.

UNITED STATES PATENT OFFICE.

LODDY G. KREMLACEK, OF FARWELL, NEBRASKA.

JOCKEY STICK.

Application filed December 13, 1928. Serial No. 325,800.

This invention relates to harness and more particularly to a device known as a jockey stick and by the use of which the number of reins required when driving four or more horses abreast may be reduced to a minimum.

One object of the invention is to provide a jockey stick which may be adjusted in order to accommodate itself to the horses and harness to which it is applied.

Another object of the invention is to provide the jockey stick with a bar formed of metal having flanges along its sides and adjacent one end bent to form a tongue to which a hook is swiveled, thereby providing a bar which will be light in weight but at the same time very strong and not liable to bend or break when in use.

Another object of the invention is to reinforce the tongue to which the hook is swiveled and prevent it from being bent out of its proper position or broken from the remainder of the bar.

Another object of the invention is to allow another hook and an eye carrying an attaching strap to be adjusted longitudinally of the bar.

The invention is illustrated in the accompanying drawing, wherein

Figure 1 is a perspective view of the improved jockey stick,

Fig. 2 is a fragmentary sectional view taken through one end of the jockey stick, and Fig. 3 is a transverse sectional view taken on the line 3—3 of Fig. 1.

The improved jockey stick includes a bar 1 formed of metal and having side flanges 2. One end portion of the bar is formed with longitudinally spaced openings 3 and its other end is bent to provide a tongue 4 which projects therefrom at substantially right angles thereto. By having the bar and its tongue formed with the side flanges they will be greatly strengthened and prevented from being bent and in addition the flanges will serve to prevent the tongue from being bent out of its proper angular relation to the body portion of the bar and further prevented from being liable to be broken off. A plate 5 is welded or otherwise firmly secured against the flanges of the tongue 4 and this plate and the tongue are formed with alined openings 6 to receive the shank of a snap hook 7 which projects from the tongue longitudinally of and away from the body portion of the bar. A collar 8 is provided about the shank of the hook to bear against the outer surface of the plate 5 and the rear end of the shank carries a securing nut 9 so that, while the shank will be allowed to turn in the openings, it will be prevented from having longitudinal movement and, therefore, will be prevented from becoming detached. It should also be noted that since the plate is spaced from the tongue, as shown in Fig. 2, the shank will be prevented from having tilting movement and this will prevent the walls of the openings being worn and cause the hook to remain substantially parallel to the bar. It will thus be seen that there has been provided a strong connection between the hook and tongue and the tongue will be greatly reinforced.

In order to connect a strap 10 with the bar, there has been provided an eye 11 having a flat shank 12 which extends transversely across the bar and has contacting engagement with the edge faces of the flanges 2. This shank is formed with an opening 13 to be alined with a selected one of the openings 3 and through the alined openings is passed a bolt 14 carrying a nut 15 which, when tightened, will pin the shank against the flanges and very firmly retain the eye in a set position upon the bar. A buckle 16 is provided so that the strap may be adjusted for length and at its free end the strap carries a snap hook 17. Between the eye and the adjacent end of the bar is provided a snap hook 18, the threaded shank 19 of which is passed through a selected opening 3 and about this shank is placed a washer 20 which bears against the edges of the flanges 2. The nut 21 carried by the shank of the hook 18 is only tightened sufficiently to prevent the hook from having longitudinal play and may be locked upon the shank in any desired manner. Therefore, the hook 18 will have a swiveled connection with the bar. It will thus be seen that the hook 18 and the eye 11 may both be adjusted longitudinally of the bar and will remain in their desired positions when the jockey stick is in use.

When the jockey stick is in use, it extends between two horses and the hook 18 is engaged in the outside bridle ring of the outside horse. The hook 7 is engaged with the ring on the hames of the inside horse and the hook 17 at the end of the strap is engaged either with a ring on the breeching of the inside horse or if harness is used which does not include a breeching the strap is shortened and the hook 17 engaged with the belly band. Since the hook 18 and the eye 11 may be adjusted longitudinally of the bar, they may be disposed properly upon the bar and the horses will be retained in proper spaced relation to each other.

Having thus described the invention, I claim:

1. A jockey stick comprising a bar having one end portion formed with longitudinally spaced openings and having its other end bent to form a tongue, a hook swiveled to said tongue and projecting therefrom longitudinally of the bar and away from the same, an eye projecting from one side of said bar and having a shank extending across the bar, a fastener extending through the shank and one opening of said bar, a strap engaged through said eye, and a hook swiveled in an opening of the bar between the shank of the eye and the adjacent end of the bar.

2. A jockey stick comprising a bar having flanges along its sides and having one end portion formed with longitudinally spaced openings between its flanges, the other end of said bar being bent to form a tongue having side flanges, a plate fixed against the flanges of said tongue, the tongue and plate having alined openings formed therein, a hook projecting longitudinally of the bar and having its shank swiveled in the openings of the plate and tongue, an eye projecting from one side of said bar and having a shank extending across the bar, a fastener extending through the shank and one opening of said bar, a strap engaged through said eye, and a hook swiveled in an opening of the bar between the shank of the eye and the adjacent end of the bar.

3. A jockey stick comprising a bar having flanges along its sides and having one end portion formed with longitudinally spaced openings between its flanges, the other end of said bar being bent to form a tongue having side flanges, a plate fixed against the flanges of said tongue, the tongue and plate having alined openings formed therein, a hook projecting longitudinally of the bar and having its shank swiveled in the openings of the plate and tongue, an eye projecting from one side of said bar and having a shank extending across the bar, a fastener passed through the shank and an opening of the bar to firmly secure the shank in contact with the edges of said flanges, a strap having an end portion passed through the eye, and a hook having a stem pass through a selected opening of the bar and securing means carried by its stem and contacting with the flanges of the bar.

In testimony whereof I affix my signature.

LODDY G. KREMLACEK. [L. S.]